(12) United States Patent
Ogiwara et al.

(10) Patent No.: US 7,694,517 B2
(45) Date of Patent: Apr. 13, 2010

(54) MASTER CYLINDER, METHOD FOR MANUFACTURING A MASTER CYLINDER, AND CHECK VALVE SYSTEM OF THE MASTER CYLINDER

(75) Inventors: Takato Ogiwara, Kanagawa (JP); Takayuki Kinoshita, Kanagawa (JP); Naganori Koshimizu, Kanagawa (JP); Tomonori Mouri, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 398 days.

(21) Appl. No.: 11/892,884

(22) Filed: Aug. 28, 2007

(65) Prior Publication Data
US 2008/0173015 A1 Jul. 24, 2008

(30) Foreign Application Priority Data
Aug. 31, 2006 (JP) ............................. 2006-236931
Jul. 27, 2007 (JP) ............................. 2007-195745

(51) Int. Cl.
*B60T 11/20* (2006.01)
*B60T 11/28* (2006.01)
(52) U.S. Cl. .......................................... 60/591; 60/585
(58) Field of Classification Search ................... 60/562, 60/585, 588, 591
See application file for complete search history.

(56) References Cited

U.S. PATENT DOCUMENTS

| 4,445,335 | A | * | 5/1984 | Melinat | 60/589 |
| 4,455,832 | A | * | 6/1984 | Gaiser et al. | 60/588 |
| 4,667,466 | A | * | 5/1987 | Mizusaki | 60/585 |
| 6,141,963 | A | * | 11/2000 | Gotoh et al. | 60/591 |

FOREIGN PATENT DOCUMENTS

JP 11-268629 10/1999

* cited by examiner

*Primary Examiner*—Thomas E Lazo
(74) *Attorney, Agent, or Firm*—Wenderoth, Lind & Ponack, L.L.P.

(57) ABSTRACT

A master cylinder designed to facilitate an operation of assembling and adjusting a check valve is provided. A supply passage for supplying operating fluid from a reservoir 2 to a pressure chamber 6 is formed in a cylinder body 3 connected to the reservoir 2. A bypass 37 for bypassing the supply passage connecting the reservoir 2 and the pressure chamber 6 is formed and provided with a check valve system 34 adapted to open when a pressure in the pressure chamber 6 is lower than that in the reservoir 2. A valve case 38 and a covering member 32 constitute a cartridge 39, which accommodates a valve body 41 and an urging spring 42, so as to form a check valve system 34. The cartridge 39 is placed in a valve chamber 33 of the bypass 37.

21 Claims, 11 Drawing Sheets (A)

(B)

MASTER CYLINDER, METHOD FOR MANUFACTURING A MASTER CYLINDER, AND CHECK VALVE SYSTEM OF THE MASTER CYLINDER

BACKGROUND OF THE INVENTION

The present invention relates to a master cylinder used in a brake system of a motor vehicle or the like, a method of manufacturing the master cylinder, and a check valve system used in the master cylinder.

In the master cylinder, a piston is slidably fitted in a cylinder body to which operating fluid is introduced from a reservoir, the cylinder body defining therein a pressure chamber in which pressure is applied to the operating fluid according to an operation of the piston. The pressure chamber is connected via a pipe to a hydraulic instrument of a brake system or the like, such that the hydraulic instrument is operated according to an operation of the piston. The cylinder body is provided with a supply passage for supplying the operating fluid from the reservoir to the pressure chamber, so as to prevent a pressure in the pressure chamber from becoming negative during an operation of returning the piston or the like.

In recent years, development has been in progress for traction control systems for automatically applying brake forces to wheels according to vehicle wheel slip conditions. In such a system, a control pump, which is a part of a hydraulic instrument, sucks operating fluid from a pressure chamber of a master cylinder and supplies the operating fluid to a wheel brake unit during a traction control. During this operation, in the master cylinder, an amount of operating fluid corresponding to the amount of operating fluid sucked from the pressure chamber is supplied from the reservoir via the supply passage to the pressure chamber. However, the supply of operating fluid is likely to be insufficient when the control pump sucks a large amount of operating fluid.

Conventionally, known master cylinders directed to this problem have a structure adapted to open a separate passage connecting the reservoir and the pressure chamber when the pressure chamber does not contain enough operating fluid (refer, for example, to Japanese Patent Public Disclosure No. HEI 11-268629). Such a master cylinder is provided with a bypass in a cylinder body thereof, the bypass bypassing a supply passage and connecting a reservoir and a pressure chamber. The bypass is provided therein with a check valve that is adapted to open when the pressure in the pressure chamber becomes lower than that in the reservoir. The check valve comprises: a valve seat member having a valve hole; a valve body adapted to detachably make contact with a valve seat of the valve seat member; and an urging spring for urging the valve body toward the valve seat. These members are disposed in a valve chamber formed in the bypass.

SUMMARY OF THE INVENTION

However, this conventional master cylinder makes it difficult to conduct a component installation and an adjustment operation, as the components that constitute the check valve have to be separately incorporated into the valve chamber.

Therefore, an object of the present invention is to provide a master cylinder designed to facilitate installation of the check valve and an adjustment operation, a method for manufacturing the master cylinder, and a check valve system for the master cylinder.

The present invention provides a master cylinder including: a cylinder body to which operating fluid is introduced from a reservoir, the cylinder body having a pressure chamber therein; a supply passage for supplying operating fluid from the reservoir to the pressure chamber; a piston slidably fitted in the cylinder body to define the pressure chamber and to open and close the supply passage according to a sliding position of the piston; and a bypass for bypassing the supply passage and connecting the reservoir and the pressure chamber, the bypass having a check valve system that is adapted to open when a pressure in the pressure chamber is lower than that in the reservoir, to thereby allow operating fluid to flow from the reservoir to the pressure chamber, wherein the check valve system comprises: a cartridge including a valve case having an opening at one end and a cover for closing the opening at the end; a valve body disposed in the cartridge and adapted to detachably seat on a valve seat; and an urging means disposed in the cartridge to urge the valve body in a direction of seating it, such that the cartridge containing the valve body and the urging means is communicably disposed in the bypass.

An annular elastic member may be placed between the valve case and the cover, so as to fix the valve case and the cover.

The valve body may be a lift valve urged by the urging means toward the valve seat, the lift valve having a valve portion and a slidable portion, the valve portion being adapted to detachably seat on the valve seat; and the cartridge may be provided with a guide portion for slidably guiding the slidable portion.

The guide portion may be provided in the cover.

The guide portion may be provided in the valve case.

The valve portion of the lift valve may have a valve-portion body integrally formed with the slidable portion and a rubber valve seal attached to the valve-portion body and adapted to detachably make contact with the valve seat.

When more than a predetermined amount of pressure is applied to press the valve seal against the valve seat, the valve seal may be adapted to be compressed in a sliding direction of the lift valve, such that the valve-portion body makes contact with the valve seat.

Further, the present invention provides a master cylinder including: a cylinder body to which operating fluid is introduced from a reservoir; a piston slidably fitted in the cylinder body to define a pressure chamber in the cylinder body; a supply passage formed in the cylinder body to supply operating fluid from the reservoir to the pressure chamber; a bypass for bypassing the supply passage and connecting the reservoir and the pressure chamber; and a check valve system placed in the bypass and adapted to open when a pressure in the pressure chamber is lower than that in the reservoir, wherein the bypass has a valve chamber where the check valve system is disposed, the valve chamber being communicated with the reservoir and the pressure chamber and defined by a recess integrally formed in the cylinder body and a covering member for closing the recess; and the check valve system comprises: a cartridge including a valve case having an opening at one end and a valve seat on an inner surface of another end and a cover for closing the opening at said one end; a valve body disposed in the cartridge and adapted to detachably seat on a valve seat of the valve case; and an urging means disposed in the cartridge to urge the valve body in a direction of seating it on the valve seat, such that the cartridge containing the valve body and the urging means is disposed in the valve chamber so as to communicate with the reservoir and the pressure chamber.

The covering member of the valve chamber may be adapted to serve as the cover of the cartridge.

The covering member may have a cylindrical shape with a closed end, an inner circumference of which is fitted around the valve casing, while an outer circumference of which is fitted in an inner circumference of the recess of the valve chamber liquid-tightly with use of a seal member.

An annular elastic member may be placed between the valve case and the cover, so as to fix the valve case and the cover.

The valve body may have a slidable portion adapted to slide on a guide portion of the valve case, the slidable portion of the valve body having: a substantially circular shape in cross-section; and a length of the slidable portion in its sliding direction that is set to be longer than a diameter of the slidable portion.

A length of the guide portion in its sliding direction may be set to be longer than the length of the slidable portion of the valve body in its sliding direction.

The cartridge may be disposed in the valve chamber, such that the valve body moves in a direction of gravity.

An upper end of the valve chamber may be disposed below the reservoir in the direction of gravity; and a reservoir passage of the bypass connecting the valve chamber and the reservoir is connected to the upper end of the valve chamber.

The valve case may be provided with an annular seal member for separating the valve chamber into a reservoir-side communication space and a pressure chamber-side communication space when the cartridge is fitted in the valve chamber.

The valve seat of the valve case has an axial hole communicating with the reservoir; and a circumferential surface of the valve case has radial holes communicating with the pressure chamber.

Further, the present invention provides a method for manufacturing a master cylinder including a cylinder body to which operating fluid is introduced from a reservoir, a piston slidably fitted in the cylinder body to define a pressure chamber in the cylinder body, a supply passage formed in the cylinder body to supply operating fluid from the reservoir to the pressure chamber, a bypass for bypassing the supply passage and connecting the reservoir and the pressure chamber, and a check valve system placed in the bypass and adapted to open when a pressure in the pressure chamber is lower than that in the reservoir, the method comprising: a step of providing a cartridge including a valve case having an opening at one end and a valve seat on an inner surface of another end and a cover for closing the opening at said one end; a step of containing, in the cartridge, a valve body adapted to detachably seat on the valve seat of the valve case and an urging means for urging the valve body in a direction of seating it; and a step of communicably disposing the cartridge containing the valve body and the urging means in the bypass.

The cover may be placed on the valve case after the valve body and the urging means is placed in the valve case, to form the check valve system.

The valve case may be placed on the cover after the valve body and the urging means are placed in the cover, to form the check valve system.

Furthermore, the present invention provides a check valve system placed in a bypass adapted to bypass a supply passage for supplying operating fluid from a reservoir to a pressure chamber formed in a cylinder body of a master cylinder and to connect the reservoir and the pressure chamber, the check valve system comprising: a cartridge including a valve case having an opening at one end and a cover for closing the opening at the end; a valve body placed in the cartridge and adapted to detachably seat on a valve seat; and an urging means placed in the cartridge and adapted to urge the valve body in a direction of seating it, wherein the opening at the end of the valve case containing the valve body and the urging means is closed by the cover to form a subassembly.

DETAILED DESCRIPTION OF THE PREFERRED EMBODIMENT

Figure 1:
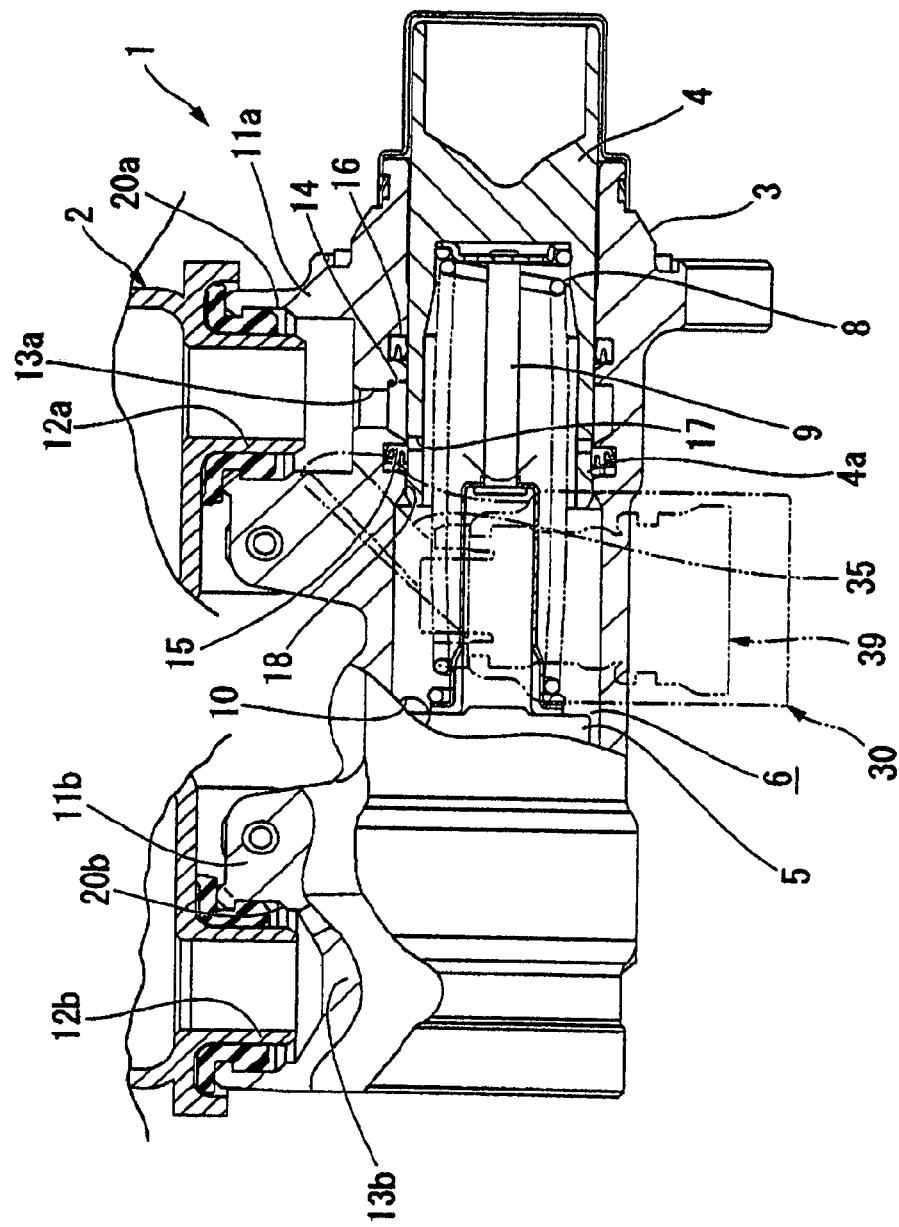
FIG. 1 is a partial cross-sectional side view of a master cylinder according to a first embodiment of the present invention.

Below, embodiments of the present invention will be described with reference to figures. In the embodiments described below, like portions are denoted by like reference numerals and redundant descriptions will be omitted. A first embodiment will be described with reference to FIGS. 1 to 9. In the figures, reference numeral 1 denotes a master cylinder of the present invention; and reference numeral 2 denotes a reservoir mounted above the master cylinder 1. The master cylinder 1 of the present embodiment is used in a vehicle brake system and adapted to supply operating fluid to a brake circuit in response to a brake operation from a driver's seat. The brake circuit is provided with a control pump (hydraulic instrument) for traction control (not shown), such that operating fluid can be sucked into the control pump from the master cylinder 1 according to vehicle driving conditions, apart from a driver's brake operation.

As shown in FIG. 1, the master cylinder 1 is a tandem master cylinder having a primary piston 4 and a secondary piston 5 disposed in series in a cylinder body 3 with a closed end. The cylinder body 3 has two pressure chambers 6 (in FIG. 1, only a rear hydraulic chamber 6 is shown) defined by the pistons 4 and 5 therein, the pressure chambers 6 being connected via a supply/drain port 10 to different brake piping systems (for example, a front-wheel brake piping system and a rear-wheel brake piping system) of the vehicle.

The primary piston 4 is slidably fitted through an open side (the right side of FIG. 1) of the cylinder body 3. An end of the primary piston 4 located on the open side is connected via a booster (not shown) to an operating rod of a brake pedal. The secondary piston 5 is slidably fitted into a portion on a closed side of the cylinder body 3, so as to define the pressure chamber 6 between the primary and secondary pistons 4 and 5 and define the other pressure chamber (not shown) between the secondary piston 5 and the closed end of the cylinder body 3. Each of pressure chambers 6 contains a return spring 8 for applying a reaction force to the primary piston 4 and the secondary piston 5 in a return direction. Each return spring 8 is integrally attached to a respective spring retainer 9 and disposed as a spring unit in each pressure chamber 6.

The cylinder body 3 is provided, on a top surface thereof, with bosses 11a and 11b for attachment of the reservoir 2, such that cylindrical supply/drain ports 12a and 12b (operating-fluid supply portions) of the reservoir 2 are connected to the respective bosses 11a and 11b. The bosses 11a and 11b have connection recesses 20a extending in a substantially perpendicular direction to an axial center of the cylinder body 3, so as to accommodate the supply/drain ports 12a and 12b of the reservoir 2.

On the other hand, the cylinder body 3 has an annular groove 14 at a potion of an inner circumferential surface of the cylinder body 3 where the primary piston 4 is fitted, such that the annular groove 14 and the connection recess 20a are connected by a communication hole 13a. Seal rings 15 and 16 are disposed at positions of the inner circumferential surface of the cylinder body 3 in front of and behind the annular groove 14 in the axial direction, so as to tightly seal the sliding clearances between the cylinder body 3 and the primary piston 4 so as to prevent any liquid from entering. Although omitted from FIG. 1, a similar annular groove is formed at a position of the inner circumferential surface of the cylinder body 3 where the secondary piston 5 is fitted, such that the annular groove and the connection recess 20b are connected by a communication hole 13b. Further, seal rings (not shown), which are similar to those disposed on the primary side, are disposed at positions in front of and behind the annular groove on the secondary side in the axial direction.

A conducting groove 18 connecting the annular groove 14 and the pressure chamber 6 is formed at a position in front of the annular groove 14 (the left side of FIG. 1) of the inner circumferential surface of the cylinder body 3. The conducting groove 18 is formed in the axial direction of the cylinder body 3, and the above-mentioned seal ring 15 is disposed at a position along an extending direction of the conducting groove 18. The seal ring 15 is formed in an E shape in cross-section and disposed in the cylinder body 3, such that an open side of the cross section faces forward (the left side of FIG. 1), and such that an inner circumferential wall of the seal ring 15 is slidably in tight contact with the outer circumferential surface of the primary piston 4. Further, an outer circumferential wall of the seal ring 15 is flexibly deformed when the pressure in the front pressure chamber 6 becomes lower than that in the rear annular groove 14, so as to open the conducting groove 18, thereby allowing a supply of operating fluid from the annular groove 14 (reservoir 2) to the pressure chamber 6. Further, the primary piston 4 has a cylindrical wall 4a facing the pressure chamber 6. The cylindrical wall 4a has return holes 17 formed radially therethrough. The return holes 17 connect the pressure chamber 6 and the annular groove 14 when the primary piston 4 is at an initial position, that is, at a rearmost position to which the primary piston 4 can move back, such that the pressure in the pressure chamber 6 and the brake circuit is maintained at an atmospheric pressure that is the same as that in the reservoir 2. Although omitted from the figures, a structure having a conducting groove and return holes similar to that on the primary side, as described above, is also employed on the secondary side.

Therefore, when the pistons 4 and 5 are at their initial positions, the reservoir 2 and the pressure chambers 6 are connected by the communication holes 13a and 13b, annular grooves 14, and return holes 17 of the pistons 4 and 5, such that operating fluid is supplied from the reservoir 2 when the pressure chambers 6 do not have a sufficient amount of operating fluid due to operation of a traction control or the like. When the pistons 4 and 5 move forward from the initial positions such that the return holes 17 are displaced forward from the positions facing the annular grooves 14, communication between the reservoir 2 and the pressure chambers 6 is substantially shut by the seal rings 15. At this time, as the pistons 4 and 5 move forward, the pressures in the pressure chambers 6 increase to supply operating fluid to the brake circuits via the supply/drain ports 10.

When the pistons 4 and 5 in this state are moved back by forces of the return springs 8, the operating fluid in the brake circuits returns through the supply/drain ports 10 to the pressure chambers 6 and 7. When the pressures in the pressure chambers 6 temporarily become lower than the internal pressure in the reservoir 2 at this time, the outer circumferential walls of the seal rings 15 are deformed as described above, such that operating fluid is supplied from the reservoir 2 via the conducting grooves 18 to make up for shortages of operating fluid in the pressure chambers 6. In the present embodiment, the communication holes 13a and 13b, annular grooves 14, and return holes 17 of the cylinder body 3 constitute supply passages of the present invention. It is to be noted that the present specification refers to the supply/drain ports 10 as a part of the pressure chambers 6.

Figure 2:
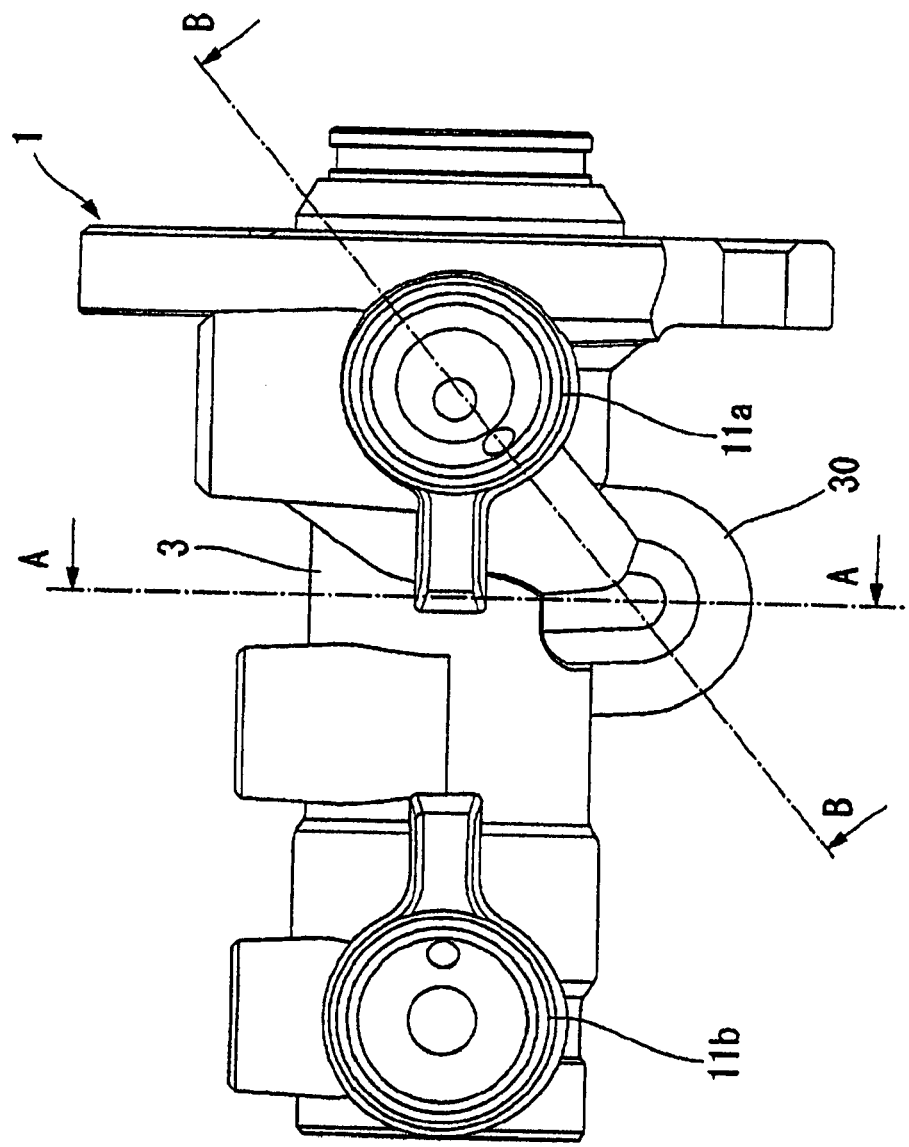
FIG. 2 is a plan view of the master cylinder of the same embodiment shown in FIG. 1.
Figure 3:
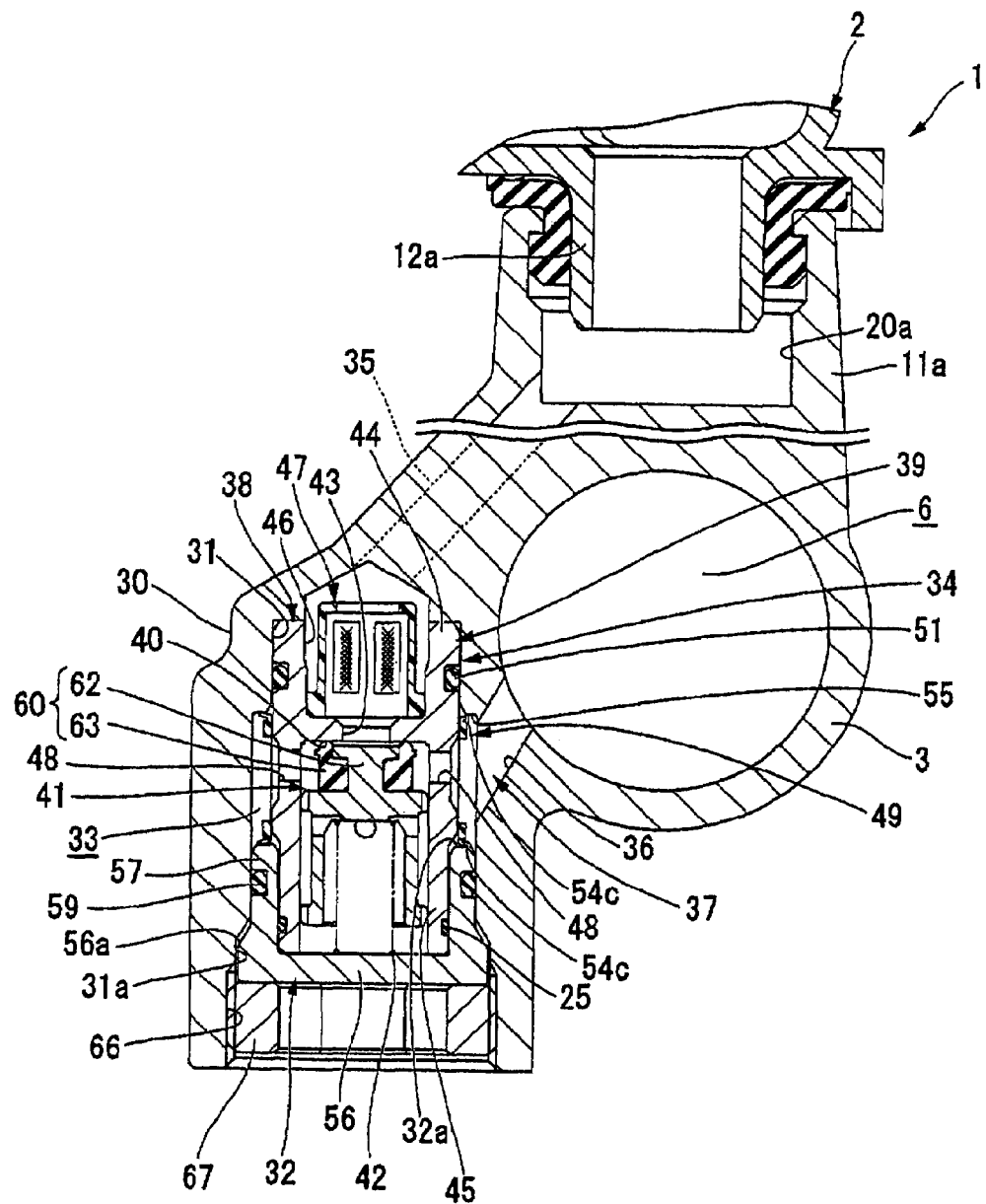
FIG. 3 is a cross-sectional view of the same embodiment in which a cross-section taken along line A-A and a cross-section taken along line B-B of FIG. 2 are combined.

As shown in FIGS. 1 to 3, a valve containing block 30 is integrally formed at a portion slightly in front of the boss 11a, on an outer lateral surface of the cylinder body 3. The valve containing block 30 is formed in a substantially cylindrical shape, so as to extend vertically downward (vertically downward when mounted in a vehicle body) from a lateral side of the cylinder body 3. As shown in FIG. 3, the valve containing block 30 has a recess 31 of a substantially circular shape in cross section that is open to a lower side. The open end of the recess 31 is covered by a covering member 32, so as to form a valve chamber 33 between the recess 31 and the covering member 32. The valve chamber 33 is provided therein with a check valve system 34, which will be described later. The valve chamber 33 is formed to extend vertically downward from a lateral portion of the cylinder body 3, such that the entire portion of the valve chamber 33 is positioned below the reservoir 2.

The valve chamber 33 has a reservoir passage 35 at an upper portion thereof (on a bottom surface of the recess 31), the reservoir passage 35 extending obliquely upward from the valve chamber 33 to connect the valve chamber 33 and the connection recess 20a (reservoir 2). The valve chamber 33 also has a pressure-chamber passage 36 formed in a lateral wall thereof, the pressure-chamber passage 36 connecting the valve chamber 33 and the pressure chamber 6 in the cylinder body 3. The reservoir passage 35, valve chamber 33, and pressure-chamber passage 36 described above constitute a bypass 37 bypassing the supply passage (the communication hole 13, annular groove 14, and return holes 17) described above and connecting the reservoir 2 and the pressure chamber 6. In the present embodiment, the pressure-chamber passage 36 is directly connected to the pressure chamber. However, the pressure-chamber passage 36 can be connected to the supply/drain port 10 that is a part of the pressure chamber 6.

The check valve system 34 has a cartridge 39 comprising a cylindrical valve case 38 having an open end and a closed end, and the covering member (cover) 32 for closing the open side of the valve case 38. In the cartridge 39, a valve body 41 being adapted to detachably seat on a valve seat 40 and an urging spring (urging means) 42 for urging the valve body 41 toward the valve seat 40 are included. The covering member 32, which is a constituent component of the cartridge 39, also functions as a cover for closing the opening of the recess 31 when the cartridge 39 is placed in the recess 31.

Figure 4:
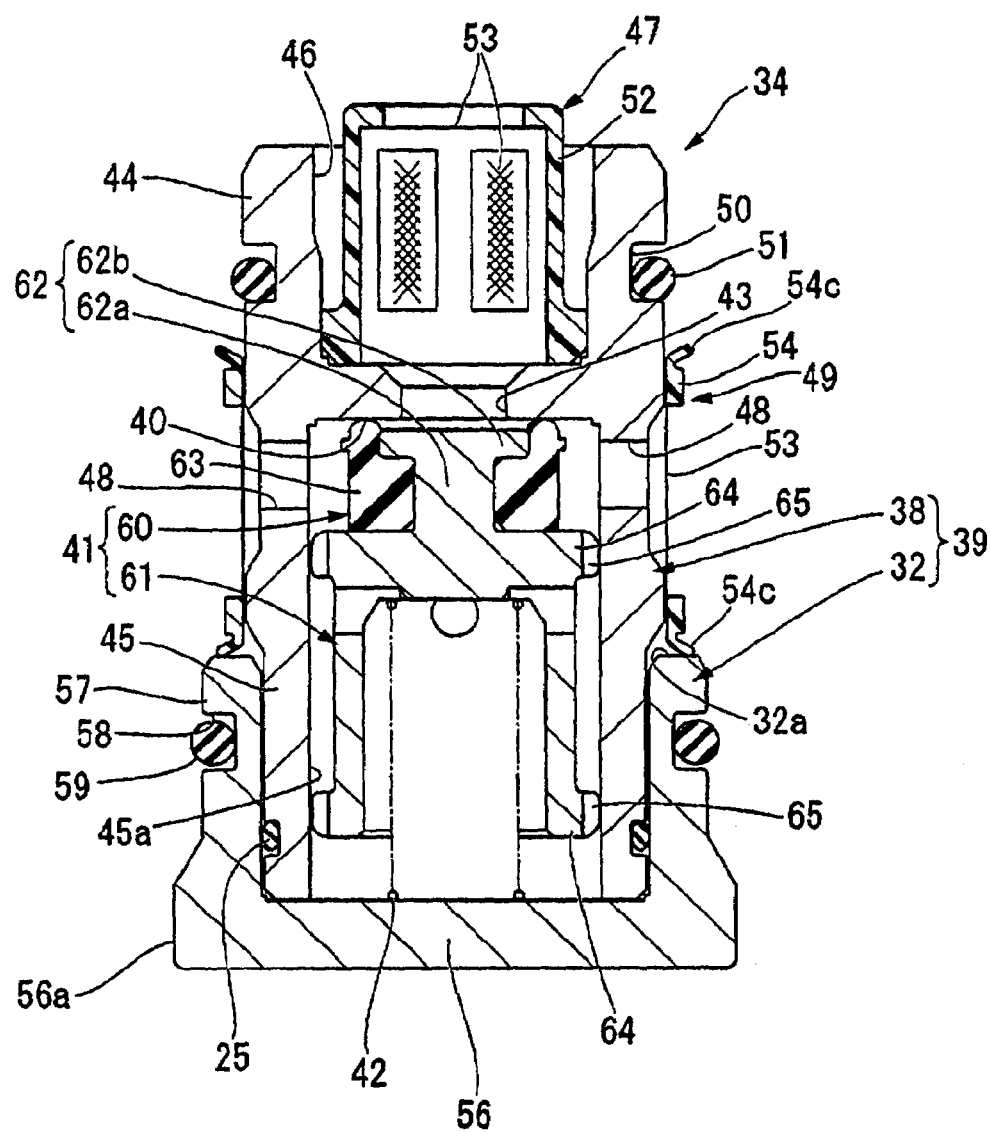
FIG. 4 is an enlarged cross-sectional view of a check valve system of the same embodiment.

As shown in FIG. 4, the valve case 38, which is a constituent component of the cartridge 39, comprises: a head wall 44 including a valve hole (axial hole) 43 that is vertically formed through an axially central portion; a cylindrical wall 45 extending downward from the head wall 44, such that a rear surface of the head wall 44, which faces the interior of the cylindrical wall 45, forms a valve seat 40. A recess 46 of a substantially circular shape is formed at a central portion on a top surface of the head wall 44. A reservoir filter member 47 of a cylindrical shape with a closed end is fixedly fitted into the recess 46. A plurality of radial holes 48 are formed at an upper end of the cylindrical wall 45, so as to radially extend through the cylindrical wall 45. The cylindrical wall 45 is provided, on an outer circumferential surface thereof, with a pressure-chamber filter member 49 of a substantially cylindrical shape, so as to cover the openings of the radial holes 48. The head wall 44 has an annular wall 50 at a position above the radial holes 48 on an outer circumferential wall. The annular groove 50 is provided with an O-ring 51 (annular seal member) that is in tight contact with the inner circumferential surface of the valve chamber 33, so as to seal a portion between the cartridge 39 and the valve chamber 33. When the cartridge 39 is placed in the valve chamber 33, the O-ring 51 is positioned between the reservoir passage 35 and the pressure-chamber passage 36, so as to separate the valve chamber 33 into a reservoir-side space and a pressure chamber-side space.

Figure 5:
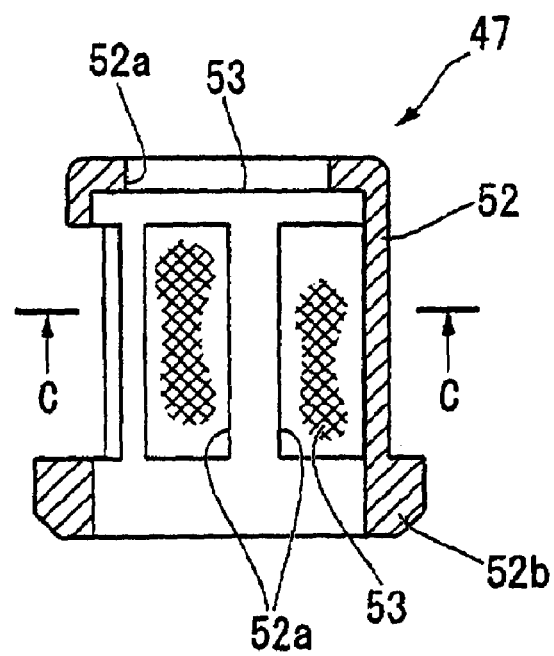
FIG. 5 is a cross-sectional view of a filter member disposed on a side of a reservoir taken along line D-D of FIG. 6 showing the same embodiment.
Figure 6:
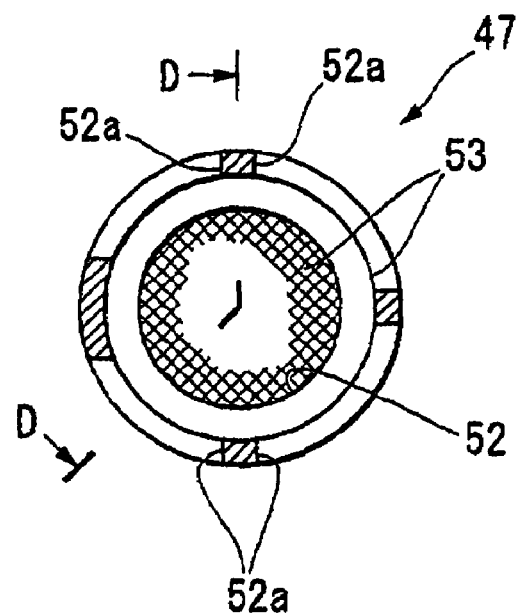
FIG. 6 is a cross-sectional view of a filter member on the side of the reservoir taken along line C-C of FIG. 5 showing the same embodiment.

As shown in FIGS. 5 and 6, the reservoir filter member 47 has windows 52a in a circumferential wall and a top wall of a cylindrical frame 52 with a closed end. The windows 52a are covered with meshes 53 that constitute a filter body. The frame 52 has an annular portion 52b of an increased thickness at a lower end thereof, the annular portion 52b being adapted to tightly fit into the recess 46 of the valve case 38.

Figure 7:
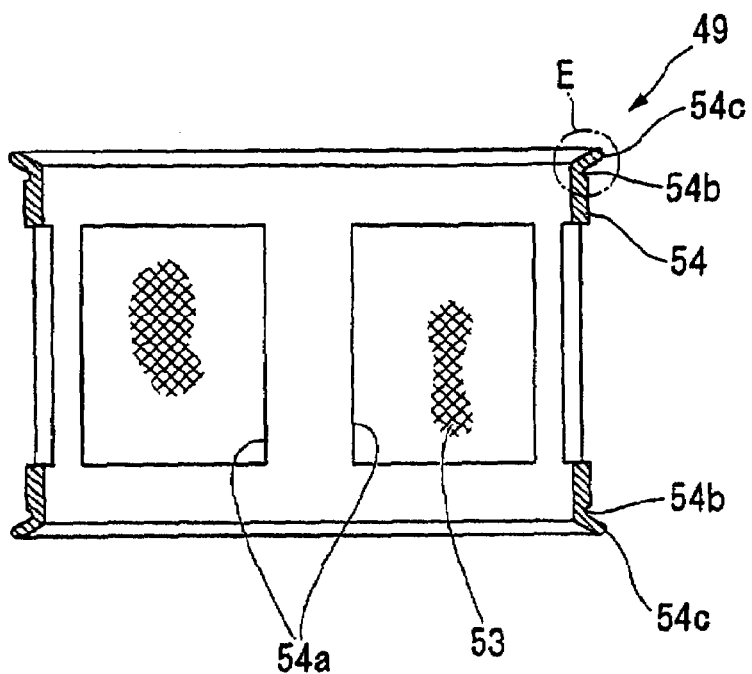
FIG. 7 is a longitudinal cross-sectional view of a filter member on a side of a pressure chamber of the same embodiment.
Figure 8:
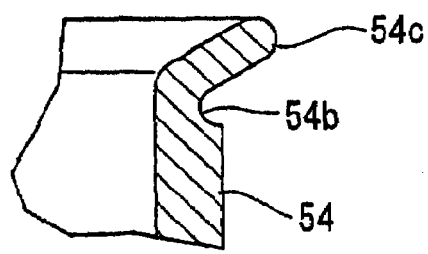
FIG. 8 is an enlarged cross-sectional view of section E of FIG. 7 showing the same embodiment.

As shown in FIGS. 7 and 8, the pressure-chamber filter member 49 includes a cylindrical frame 54 having a circumferential wall in which a plurality of windows 54a are formed. The windows 54a are each covered with a mesh 53. As shown in an enlarged view in FIG. 8, annular lips 54c with a reduced thickness are integrally formed at the top and bottom ends of the frame 54 and are each provided, at a base thereof, with an annular depression 54b. The annular lips 54c each have a tapered tip extending radially outward, such that its entire circumferential portion can be elastically deformed when a load in an axial direction is applied to it. As shown in FIG. 3, when the cartridge 39 is fitted in the valve chamber 33, the annular lip 54c on the top side of the pressure-chamber filter member 49 makes contact with an annular stepped portion 55 formed above the pressure-chamber passage 36 in the valve chamber 33, while the annular lip 54c on the bottom side of the pressure-chamber filter member 49 makes contact with an end surface 32a of the covering member 32.

Figure 9:
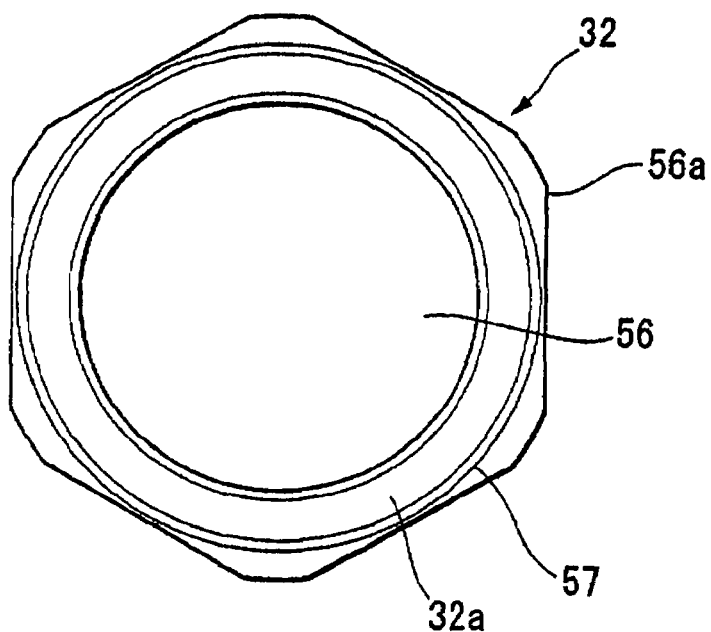
FIG. 9 is a top view (A) and a longitudinal cross-sectional view (B) of a covering member of the same embodiment.
Figure 9:
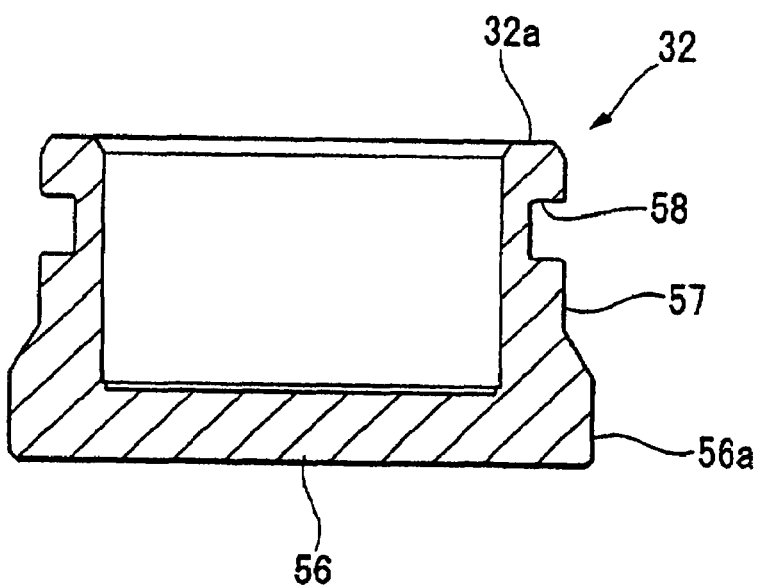

As shown in FIG. 9, the covering member 32 of the cartridge 39 as a whole is formed in a cylindrical shape with a closed end. A circumferential wall 57 extending from a bottom wall 56 is adapted to fit around an outer circumference at a bottom end of the cylindrical wall 45 of the valve case 38. The circumferential wall 57 has an annular groove 58 on an outer circumferential surface thereof. The annular groove 58 is provided with an O-ring (seal member) 59 for sealing a portion between the annular groove 58 and the valve chamber 33. It is to be noted that an O-ring (annular elastic member) 25 with a small cross section is fitted around an outer circumference of a bottom end of the cylindrical wall of the valve case 38. When the covering member 32 is fitted around the valve case 38, the O-ring 25 is elastically deformed to make tight contact with the covering member 32 and the valve case 38, so as to temporarily fix the covering member 32 and the valve case 38. The force exerted by the O-ring 25 to engage the covering member 32 and the valve case 38 is large enough to prevent the cartridge 39 from disassembling while the cartridge 39 is shipped or incorporated into the valve containing block 30. The outer circumference of the bottom wall 56 of the covering member 32 forms an octagonal locking portion 56a, which is adapted to fit into an octagonal locking groove 31a formed in the recess 31 of the valve chamber 33.

The valve body 41, which is to be fitted in the cartridge 39, is a lift valve that is adapted to move up and down inside the cylindrical wall 45 of the valve case 38. As shown in an enlarged view in FIG. 4, the valve body 41 comprises: a valve portion 60 that is adapted to detachably seat on the valve seat 40 of the valve case 38; and a leg portion (slidable portion) 61 of a substantially cylindrical shape extending downward from the valve portion 60, such that an outer circumferential surface of the leg portion 61 can be slid and guided on an inner circumferential surface (guide portion) 45a of the cylindrical wall 45 of the valve case 38. The valve portion 60 comprises a metal valve-portion body 62 integrally formed with the leg portion 61 and a rubber valve seal 63 attached to the valve-portion body 62. The valve-portion body 62 has a support shaft 62a projecting along the axial center of the valve portion 60 and a flange 62b at a tip of the support shaft 62a. The annular valve seal 63 is fixedly fitted around the support shaft 62a and the flange 62b. The valve seal 63 has an end projecting upward of the flange 62b in an annular shape, such that the end of the valve seal makes elastic contact with the valve seat 46 around the valve hole 43 when the valve portion 60 is displaced upward. However, when the valve seal 63 is pressed by a load greater than a predetermined value into contact with the valve seat 40, the metal flange 62b makes direct contact with the valve seat 40 due to elastic deformation of the valve seal 63. The leg portion 61 has flanges 64 on outer circumferences of the top and bottom ends. The flanges 64 are guided mainly by the cylindrical wall 45 of the valve case 38. The length of the leg portion 61 including the flanges 64 in the sliding direction of the leg portion 61 is set to be longer than a maximum radius of the leg portion 61. The length of the cylindrical wall 45 of the valve case 38 in the sliding direction is set to be longer than the length of the leg portion 61 in the sliding direction. The flanges 64 at the top and bottom of the leg portion 61 have a plurality of grooves 65 to allow passage of operating fluid.

The urging spring 42 is placed between a rear surface of the valve-portion body 62 surrounded by the leg portion 61 and the bottom wall 56 of the covering member 32. In the present embodiment, the urging spring 42 is inserted with the valve body 41 in the cylindrical wall 45 of the valve case 38, and the covering member 32 is fitted onto the valve case 38, such that the urging spring 42 is placed in a compressed state between the rear surface of the valve-portion body 62 and the bottom wall 56 of the covering member 32. The recess 31 of the valve chamber 33 has a female thread 66 at a portion closer to the opening on an inner circumference of the recess 31. In this way, the covering member 32 of the cartridge 39 can be tightly fixed to the valve containing block 30 by fitting the cartridge 39 into the recess 31 and then screwing a nut 67 into the female thread 66.

In the above-described structure, when traction control is put into operation for a running vehicle, the control pump in the brake circuit sucks operating fluid from the master cylinder 1. When the pressure in the first pressure chamber 6 of the master cylinder 1 becomes lower than that in the reservoir 2 by more than a predetermined amount of pressure, the valve body 41 of the check valve system 34 in the valve containing block 30 is displaced perpendicularly downward against a force of the urging spring 42. At this time, the valve portion 60 is separated from the valve seat 40 to connect the pressure-chamber passage 36 of the bypass 37 and the reservoir passage 35. In this way, operating fluid in the reservoir 2 is transmitted through the reservoir passage 35, valve hole 43, radial holes 48, and pressure-chamber passage 36 in this order and supplied to the pressure chamber 6. Therefore, a sufficient amount of operating fluid can be promptly supplied from the pressure chamber 6 to the control pump, so as to reliably obtain a desired traction control and prevent the pressure in the master cylinder 1 from becoming negative.

In the master cylinder 1, the valve body 41 and the urging spring 42 are accommodated in the cartridge 39 comprising the valve case 38 and the covering member 32, and then the cartridge 39 is placed in the valve chamber 33 of the valve containing block 30. Therefore, the valve seat 40 and the valve body 41 of the check valve system 34 can be assembled and adjusted with high precision at another place where such work can be easily conducted. Further, the valve body 41, while being surrounded by the cartridge 39, is shipped and incorporated into the valve containing block 30. Therefore, the valve body 41 can be reliably prevented from interfering with surrounding members and from being damaged.

In this master cylinder 1, the valve case 38 and the covering member 32 are fixed by the O-ring 25 placed therebetween to constitute the cartridge 39. Despite its very simple structure, the cartridge 39, while containing the valve body 41 and the urging spring 42, can be fitted into the recess 31 of the valve chamber 33 and reliably secured in the recess 31 by tightening the nut 67 into the recess 31. As another advantage of this master cylinder 1, a smaller number of components is required, since the covering member 32 of the cartridge 39 also serves as a lid for the recess 31 of the valve chamber 33.

Figure 10:
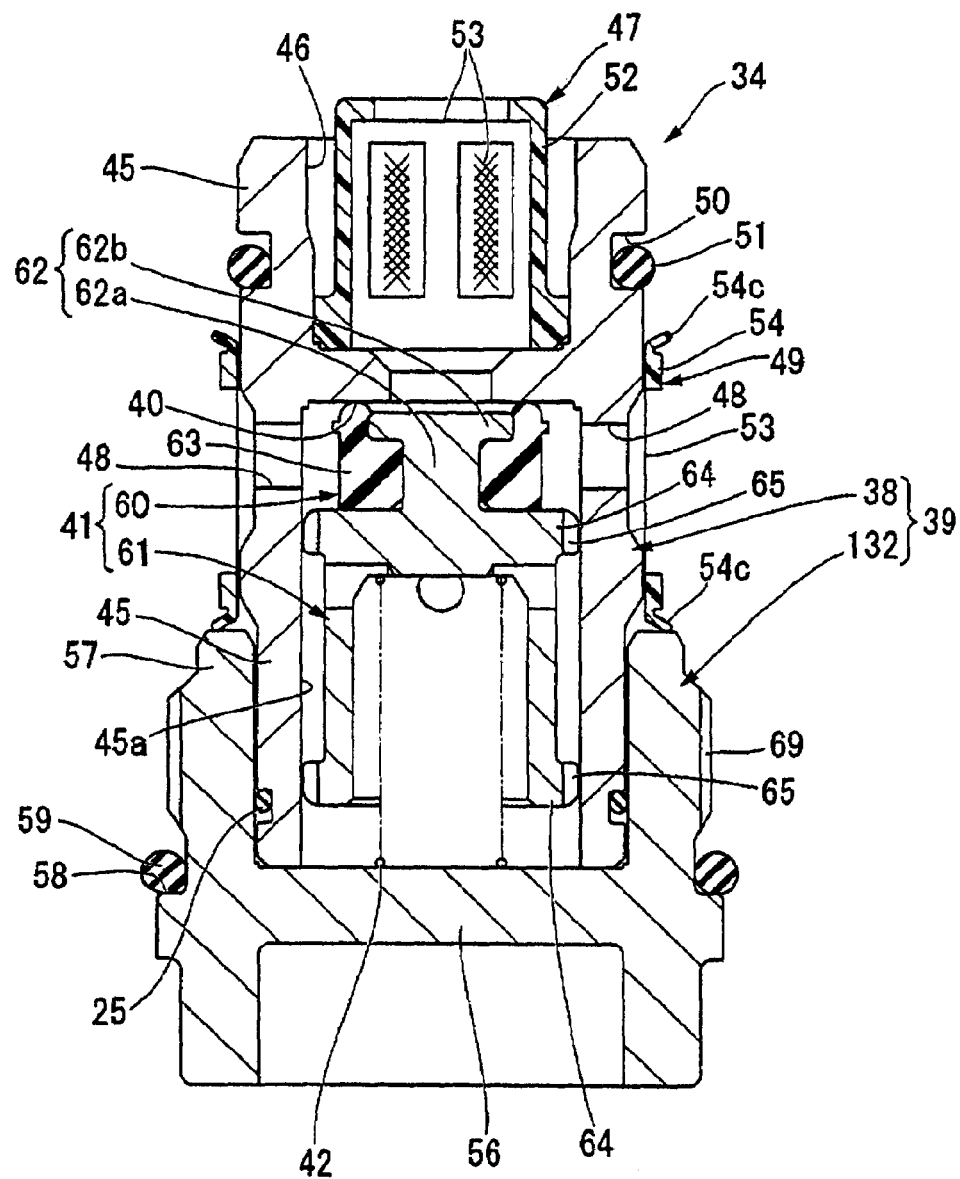
FIG. 10 is an enlarged cross-sectional view of a check valve system according to a second embodiment of the present invention.

In the present embodiment, the covering member 32 is fitted in the recess 31, so as not to rotate, and is pressed for fixation by tightening the nut 67 inward. In this way, the O-ring 59 placed between the cartridge 39 and the recess 31 is prevented from being twisted during the fixation. As a result, a stable sealing effect can be reliably obtained. FIG. 10 shows the second embodiment. As shown in this figure, it is also possible to form a male thread 69 on an outer circumference of a covering member 132 and directly screw the covering member 132 into the recess of the valve chamber. This further reduces the number of components.

In the master cylinder 1, the cylindrical wall 45 for guiding a sliding movement of the leg portion 61 of the valve body 41, and the valve seat 40 are integrally formed in the valve case 38. Therefore, the valve body 41 can be seated on the valve seat 40 with increased precision. Further, since the length of the leg portion 61 of the valve body 41 in its sliding direction is set to be longer than the diameter of the leg portion 61, the posture of the valve body 41 during its operation can be further stabilized. The valve portion 60 of the valve body 41 comprises a metal valve-portion body 62 and a rubber valve seal 63. The valve seal 63 is adapted to make tight contact with the valve seat 40 for liquid-tight closure. When the valve body 41 is subjected to a high pressure from the pressure chamber 6 to press the valve seal 63 against the valve seat 40, the valve-portion body 62 is brought into direct contact (metal-contact) with the valve seat 40, so as to prevent any gap from being formed in a boundary portion between the pressure chamber 6 and the reservoir 2 (atmospheric pressure) (a portion surrounded by the valve seat 40 due to the contact of the valve seal 63), which would cause damage to the valve seal 63 if the valve seal 63 were drawn into the gap. This enables lasting protection and liquid tightness of the valve seal 63.

Further, in the master cylinder 1, the check valve system 34 is disposed in the valve containing block 30, such that the valve body 41 moves in the direction of gravity. In this way, any air flow from the pressure chamber 6 into the valve chamber 33 can be discharged to the outside as the valve body 41 moves. Particularly, in the present embodiment, the reservoir 2 is placed above the valve chamber 33; and an upper end of the valve chamber 33 and the reservoir 2 are connected by the reservoir passage 35. Therefore, any air flow into the valve chamber 33 can be efficiently discharged into the reservoir 2.

Figure 11:
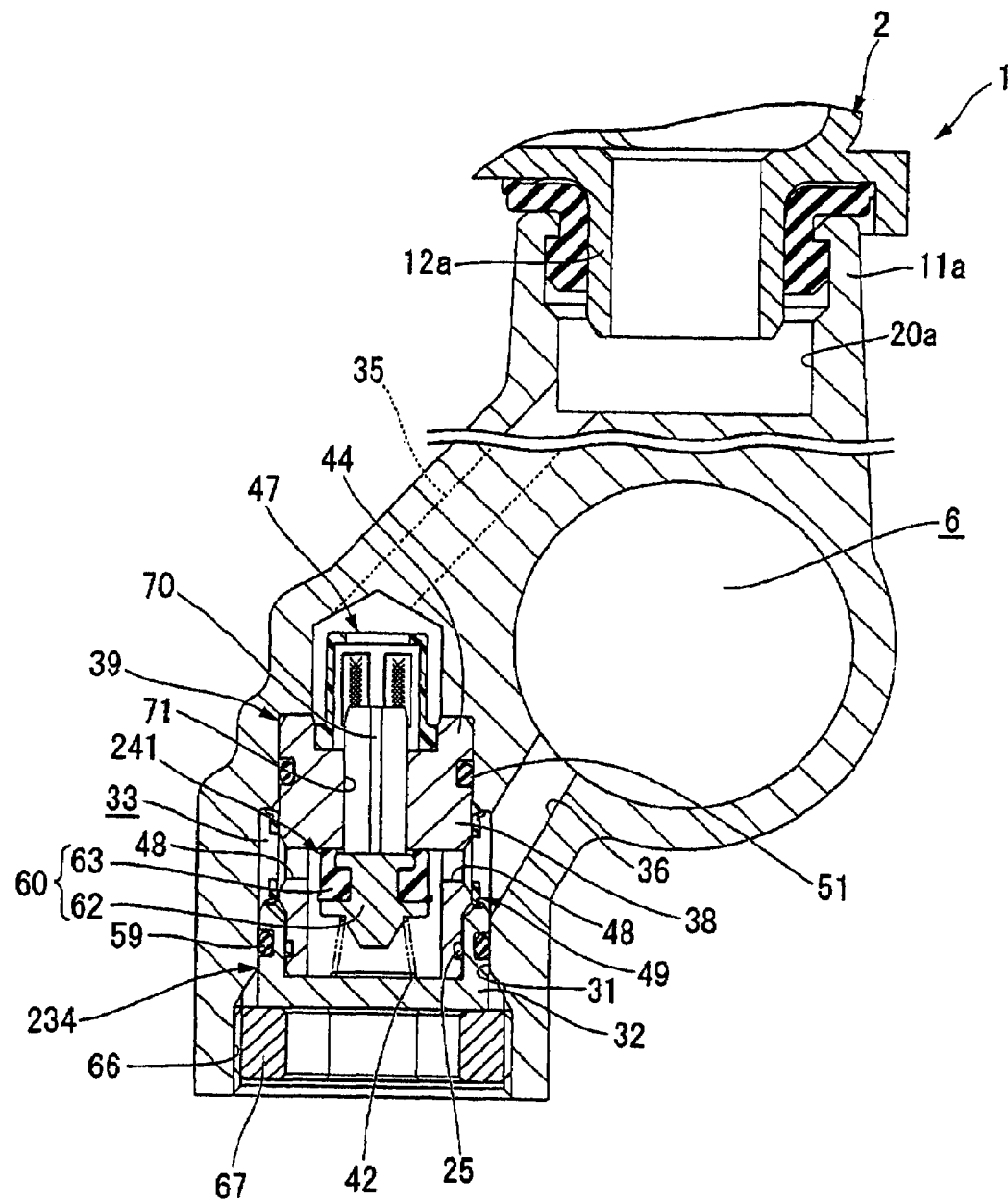
FIG. 11 is a cross-sectional view similar to that of FIG. 3, showing a third embodiment of the present invention.
Figure 12:
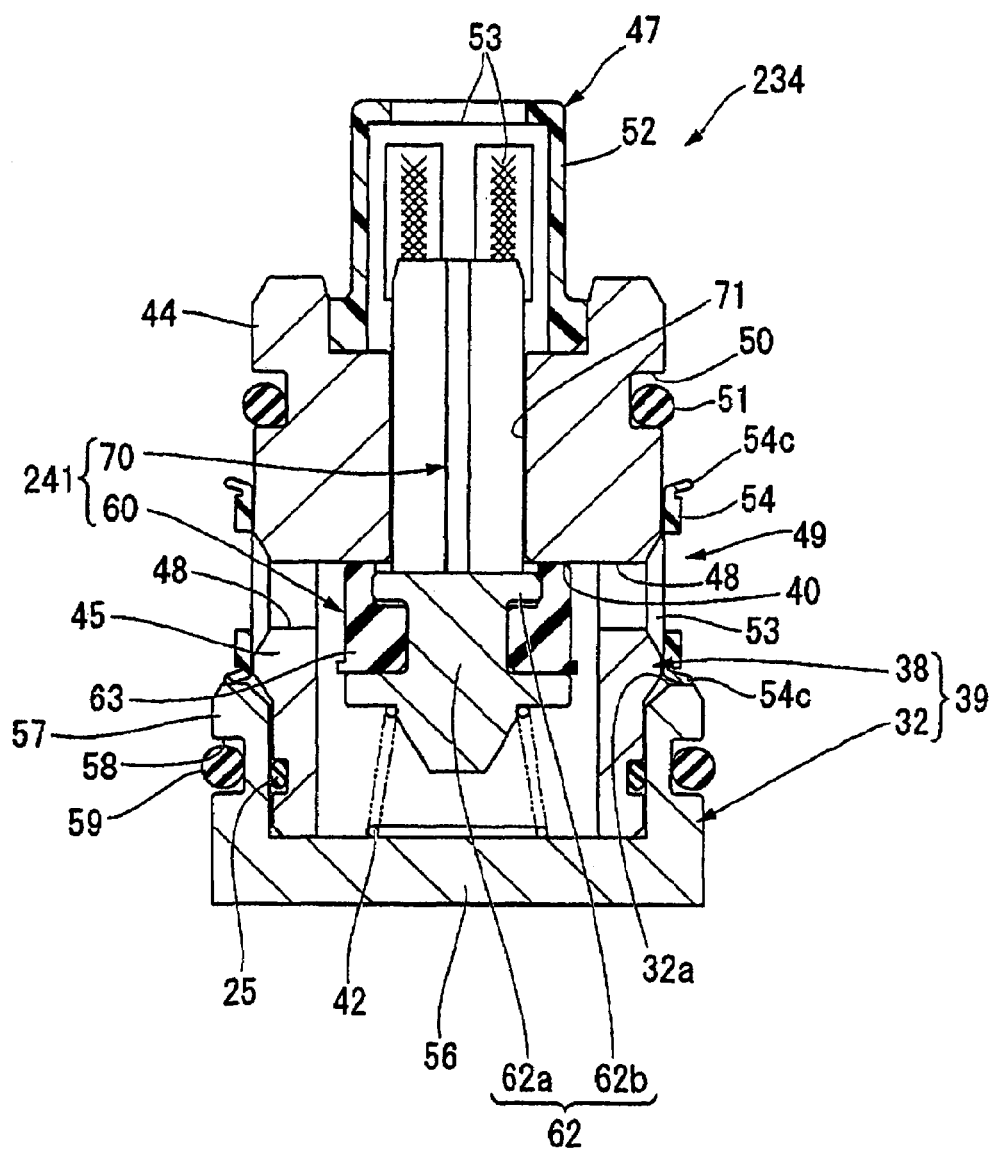
FIG. 12 is an enlarged cross-sectional view of a check valve system of the same embodiment.

Next, the third embodiment of the present invention will be described with reference to FIGS. 11 and 12. The present embodiment has a basic structure similar to that of the first embodiment, but the structure of a check valve system 34 accommodated in the recess 31 of the valve chamber 33 is different. Specifically, the structure of the check valve system 34 is the same; in that, the cartridge 39 comprises the valve case 38 and the covering member 32; and a valve body 241 and the urging spring 42 are accommodated in the cartridge 39, and so on. However, the structure of the valve body 241 and the structure of a guide portion for the valve body 241 are different.

The valve body 241 has a guide shaft 70 extending from the valve portion 60 including the metal valve-portion body 62 and the rubber valve seal 63, the guide shaft 70 having a substantially cross shape in cross-section. The guide shaft 70 is slidably inserted in a guide hole 71 of the head wall 44 of the valve case 38, the guide hole 71 also serving as a valve hole. In the present embodiment, the guide shaft 70 of the guide body 241 is guided by the guide hole 71, whereby the valve body 241 moves up and down. The axial length of the guide shaft 70 is set to be at least greater than the sum of an axial length of the guide hole 71 and a stroke of the valve body 241. In this way, the valve body 241 can always be guided stably along a certain length in the sliding direction. Although the valve body 241 and its guide portion of the present embodiment are slightly different in structure, the present embodiment can bring about substantially the same effects as those brought about by the first embodiment.

Figure 13:
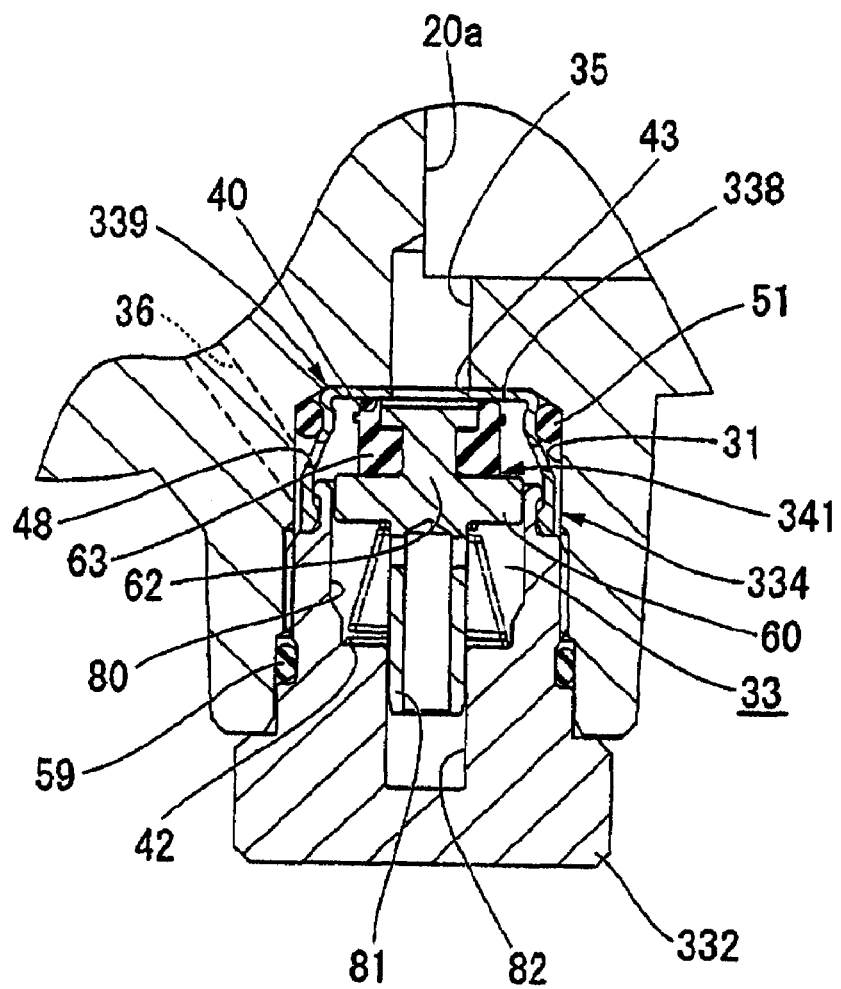
FIG. 13 is a longitudinal cross-sectional view of a fourth embodiment of the present invention.

FIG. 13 shows the fourth embodiment of the present invention. In the present embodiment, a cartridge 339 containing a valve body 341 and the urging spring 42 comprises a valve case 338 and a covering member 332, as in the other embodiments. However, a recess 80 that allows upward and downward movements of the valve body 341 and a structure for guiding the movements of the valve body 341 are formed in the covering member 332. A valve case 338 has a valve seat 40 adapted to detachably make contact with the valve body 341, a valve hole 43, and radial holes 48; and is reduced in thickness and size compared to those of the above-described other embodiments. In the present embodiment, the valve case 338 and the covering member 332 are fixed to each other by connection of a projection and a recess formed at their annular portions.

The valve body 341 has a guide cylinder 81 extending from the valve portion 60 comprising the metal valve-portion body 62 and the rubber valve seal 63. The guide cylinder 81 has a tip slidably supported by a guide hole 82 that is formed in an axially central portion of the recess 80 of the covering member 332. The urging spring 42 is placed between the recess 80 and the valve portion 60. An O-ring 51 is placed between an upper corner of the valve case 338 and an inner circumferential surface of the recess 31, so as to separate the valve chamber 33 into a reservoir-side space and a pressure chamber-side space. The cartridge 339 is assembled by placing the urging spring 42 and the valve body 341 in the recess 80 of the covering member 332 and fixedly fitting the valve case 338 around an upper portion of the covering member 332.

Although the valve case 338, covering member 332, valve body 341, and so on of the master cylinder 301 of the present embodiment are slightly different in structure from the other embodiments above, the cartridge 339 containing the valve body 341 and the urging spring 42 is disposed in the valve chamber 33. Therefore, as described in the other embodiments above, the valve seat 40 and valve body 341 can be assembled and adjusted with high precision at another place where such work can be easily conducted. During an assemblage and a shipment, the valve body 341 can be prevented from interfering with surrounding members and being damaged.

According to the above-described embodiments, the valve body adapted to detachably seat on the valve seat, and the urging means for urging the valve body toward the valve seat are placed in the cartridge comprising the valve case and the cover, and the cartridge is disposed in the bypass. Therefore, the check valve can be assembled and adjusted at another place where such work can be easily conducted before the check valve is disposed in the bypass. Further, the valve body is shipped and assembled after it is accommodated in the cartridge. This reliably prevents the valve body from interfering with surrounding members or the like and being damaged.

In the first to third embodiments, the annular elastic member is provided between the valve case and the cover, so as to fix the valve case and the cover. Since the valve case and the cover can be fixed by the annular elastic member placed provided therebetween, the cartridge containing the valve body and urging means can be reliably incorporated in the bypass despite its very simple structure, as compared with the cartridge incorporated into the bypass by screwing, crimping, or the like.

According to the embodiments, the valve body is a lift valve urged by the urging means toward the valve seat. The lift valve has a valve portion adapted to detachably seat on the valve seat, and a slidable portion, while the cartridge has a guide portion for slidably guiding the slidable portion. In this way, the slidable portion can be guided by the guide portion of the cartridge. As a result, the seating posture of the valve portion can always be maintained with stability.

According to the above first to third embodiments, the guide portion is provided in the valve case; therefore, the valve body can be seated on the valve seat with high precision.

According to the above embodiments, the valve portion, which is a lift valve, comprises a valve-portion body integrally formed with the slidable portion and a rubber valve seal that is adapted to detachably seat on the valve seat and thereby, reliable valve closure can be maintained by bringing the rubber valve seal into tight contact with the valve seat.

According to the above embodiments, when the valve seal is pressed with a load greater than a predetermined value in its sliding direction, the valve-portion body makes contact with the valve seat. Therefore, any gap in a boundary portion between the pressure chamber and the reservoir is eliminated, which in turn eliminates the possibility of the valve seal entering the gap, which would cause damage to the valve seal. As a result, the valve seal can function over a long period of time.

According to the above embodiments, the cover of the cartridge also functions as the cover of the valve chamber. Therefore, the number of components and product cost can be reduced.

According to the first to third embodiments, the covering member is formed in a cylindrical shape with a closed end, such that the inner circumference of the covering member is fitted around the valve casing, while the outer circumference is fitted in the recess of the valve chamber tightly with use of the seal member so as to prevent liquid from entering. This reliably prevents any leak of fluid through the covering member.

According to the first and second embodiments, the sliding portion of the valve body has a substantially circular shape in cross-section, and the length of the slidable portion in its sliding direction is set to be longer than the diameter of the slidable portion. Therefore, the valve body can slide in the valve case, always maintaining a stable posture.

According to the first to third embodiments, the cartridge is disposed in the valve chamber, such that the valve body moves in the direction of gravity. Any air in the valve chamber can be efficiently discharged to the outside during operation of the valve body, as compared with a case in which the valve body is adapted to move horizontally.

According to the first to third embodiments, the upper end of the valve chamber is disposed below the reservoir, and the reservoir passage is connected to the upper end of the valve chamber. Therefore, any air in the valve chamber can be reliably discharged via the reservoir passage into the reservoir during operation of the valve body.

According to the first to third embodiments, the annular seal is disposed in the valve case to separate the valve chamber into the reservoir-side communication space and the valve chamber-side communication space. Therefore, the backflow preventing function of the check valve can be maintained.

The present invention is not limited to the above-described embodiments, but various changes may be made without departing from the scope of the invention. For example, the above embodiments are described in terms of a tandem master cylinder, but the present invention can also be applied to a single-type master cylinder that has one piston.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2006-236931, filed on Aug. 31, 2006 and Japanese Patent Application No. 2007-195745, filed on Jul. 27, 2007. The entire disclosure of Japanese Patent Applications Nos. 2006-236931 and 2007-195745 including specification, claims, drawings and summary is incorporated herein by reference in its entirety.

What is claimed is:

1. A master cylinder including: a cylinder body to which operating fluid is introduced from a reservoir, the cylinder body having a pressure chamber therein; a supply passage for supplying operating fluid from the reservoir to the pressure chamber; a piston slidably fitted in the cylinder body to define the pressure chamber and to open and close the supply passage according to a sliding position of the piston; and a bypass for bypassing the supply passage and connecting the reservoir and the pressure chamber, the bypass having a check valve system that is adapted to open when a pressure in the pressure chamber is lower than that in the reservoir, to thereby allow operating fluid to flow from the reservoir to the pressure chamber, wherein
 the check valve system comprises: a cartridge including a valve case having an opening at one end and a cover for closing the opening at the end; a valve body disposed in the cartridge and adapted to detachably seat on a valve seat; and an urging means disposed in the cartridge to urge the valve body in a direction of seating it, such that the cartridge containing the valve body and the urging means is communicably disposed in the bypass.

2. A master cylinder according to claim 1, wherein an annular elastic member is placed between the valve case and the cover, so as to fix the valve case and the cover.

3. A master cylinder according to claim 1, wherein the valve body is a lift valve urged by the urging means toward the valve seat, the lift valve having a valve portion and a slidable portion, the valve portion being adapted to detachably seat on the valve seat; and the cartridge is provided with a guide portion for slidably guiding the slidable portion.

4. A master cylinder according to claim 3, wherein the guide portion is provided in the cover.

5. A maser cylinder according to claim 3, wherein the guide portion is provided in the valve case.

6. A master cylinder according to claim 3, wherein the valve portion of the lift valve has a valve-portion body integrally formed with the slidable portion and a rubber valve seal attached to the valve-portion body and adapted to detachably make contact with the valve seat.

7. A master cylinder according to claim 6, wherein, when more than a predetermined amount of pressure is applied to press the valve seal against the valve seat, the valve seal is compressed in a sliding direction of the lift valve, such that the valve-portion body makes contact with the valve seat.

8. A master cylinder including: a cylinder body to which operating fluid is introduced from a reservoir; a piston slidably fitted in the cylinder body to define a pressure chamber in the cylinder body; a supply passage formed in the cylinder body to supply operating fluid from the reservoir to the pressure chamber; a bypass for bypassing the supply passage and connecting the reservoir and the pressure chamber; and a check valve system placed in the bypass and adapted to open when a pressure in the pressure chamber is lower than that in the reservoir, wherein
 the bypass has a valve chamber where the check valve system is disposed, the valve chamber being communicated with the reservoir and the pressure chamber and defined by a recess integrally formed in the cylinder body and a covering member for closing the recess; and
 the check valve system comprises: a cartridge including a valve case having an opening at one end and a valve seat on an inner surface of another end and a cover for closing the opening at said one end; a valve body disposed in the cartridge and adapted to detachably seat on a valve seat of the valve case; and an urging means disposed in the cartridge to urge the valve body in a direction of seating it on the valve seat, such that the cartridge containing the valve body and the urging means is disposed in the valve chamber so as to communicate with the reservoir and the pressure chamber.

9. A master cylinder according to claim 8, wherein the covering member of the valve chamber serves as the cover of the cartridge.

10. A master cylinder according to claim 9, wherein the covering member has a cylindrical shape with a closed end, an inner circumference of which is fitted around the valve case, while an outer circumference of which is fitted in an inner circumference of the recess of the valve chamber liquid-tightly with use of a seal member.

11. A master cylinder according to claim 8, wherein an annular elastic member is placed between the valve case and the cover, so as to fix the valve case and the cover.

12. A maser cylinder according to claim 8, wherein the valve body has a slidable portion adapted to slide on a guide portion of the valve case, the slidable portion of the valve body having: a substantially circular shape in cross-section; and a length of the slidable portion in its sliding direction that is set to be longer than a diameter of the slidable portion.

13. A master cylinder according to claim 12, wherein a length of the guide portion in its sliding direction is set to be longer than the length of the slidable portion of the valve body in its sliding direction.

14. A master cylinder according to claim 8, wherein the cartridge is disposed in the valve chamber, such that the valve body moves in a direction of gravity.

15. A master cylinder according to claim 14, wherein an upper end of the valve chamber is disposed below the reservoir in the direction of gravity; and a reservoir passage of the bypass connecting the valve chamber and the reservoir is connected to the upper end of the valve chamber.

16. A master cylinder according to claim 8, wherein the valve case is provided with an annular seal member for separating the valve chamber into a reservoir-side communication space and a pressure chamber-side communication space when the cartridge is fitted in the valve chamber.

17. A master cylinder according to claim 16, wherein the valve seat of the valve case has an axial hole communicating with the reservoir; and a circumferential surface of the valve case has radial holes communicating with the pressure chamber.

18. A method for manufacturing a master cylinder including a cylinder body to which operating fluid is introduced from a reservoir, a piston slidably fitted in the cylinder body to define a pressure chamber in the cylinder body, a supply passage formed in the cylinder body to supply operating fluid from the reservoir to the pressure chamber, a bypass for bypassing the supply passage and connecting the reservoir and the pressure chamber, and a check valve system placed in the bypass and adapted to open when a pressure in the pressure chamber is lower than that in the reservoir, the method comprising:
 a step of providing a cartridge including a valve case having an opening at one end and a valve seat on an inner surface of another end and a cover for closing the opening at said one end; a step of containing, in the cartridge, a valve body adapted to detachably seat on the valve seat of the valve case and an urging means for urging the valve body in a direction of seating it; and a step of communicably disposing the cartridge containing the valve body and the urging means in the bypass.

19. A method for manufacturing a master cylinder according to claim 18, wherein the cover is placed on the valve case after the valve body and the urging means is placed in the valve case, to form the check valve system.

20. A method for manufacturing a master cylinder according to claim 18, wherein the valve case is placed on the cover after the valve body and the urging means are placed in the cover, to form the check valve system.

21. A check valve system placed in a bypass adapted to bypass a supply passage for supplying operating fluid from a reservoir to a pressure chamber formed in a cylinder body of a master cylinder and to connect the reservoir and the pressure chamber, the check valve system comprising:

a cartridge including a valve case having an opening at one end and a cover for closing the opening at the end; a valve body placed in the cartridge and adapted to detachably seat on a valve seat; and an urging means placed in the cartridge and adapted to urge the valve body in a direction of seating it, wherein the opening at the end of the valve case containing the valve body and the urging means is closed by the cover to form a subassembly.

\* \* \* \* \*